US010960647B2

(12) United States Patent
Nohara et al.

(10) Patent No.: US 10,960,647 B2
(45) Date of Patent: Mar. 30, 2021

(54) LIGHT-EMITTING DISPLAY SYSTEM AND HEAD-UP DISPLAY

(71) Applicant: SEKISUI CHEMICAL CO., LTD., Osaka (JP)

(72) Inventors: Atsushi Nohara, Shiga (JP); Daisuke Nakajima, Shiga (JP); Yuusuke Oota, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/475,767

(22) PCT Filed: Mar. 27, 2018

(86) PCT No.: PCT/JP2018/012418
§ 371 (c)(1),
(2) Date: Jul. 3, 2019

(87) PCT Pub. No.: WO2018/181302
PCT Pub. Date: Oct. 4, 2018

(65) Prior Publication Data
US 2019/0351654 A1 Nov. 21, 2019

(30) Foreign Application Priority Data
Mar. 30, 2017 (JP) .............................. JP2017-068921

(51) Int. Cl.
*B32B 17/10* (2006.01)
*F21V 9/32* (2018.01)
(Continued)

(52) U.S. Cl.
CPC .. *B32B 17/10541* (2013.01); *B32B 17/10036* (2013.01); *B32B 17/10669* (2013.01);
(Continued)

(58) Field of Classification Search
CPC ... B32B 17/10541; B32B 27/30; B32B 17/30; B32B 17/10761; B32B 17/10669;
(Continued)

(56) References Cited

U.S. PATENT DOCUMENTS 9,477,022 B2 * 10/2016 Laluet .................... G02B 27/01
9,677,741 B2 *  6/2017 Hsu ........................... G02F 1/19
(Continued)

FOREIGN PATENT DOCUMENTS

EP          1793261      *  6/2007   ............. G02B 27/01
JP          4-502525           5/1992
(Continued)

OTHER PUBLICATIONS

International Preliminary Report on Patentability dated Sep. 4, 2019 in International (PCT) Application No. PCT/JP2018/012418.
(Continued)

*Primary Examiner* — Peggy A Neils
(74) *Attorney, Agent, or Firm* — Wenderoth, Lind & Ponack, L.L.P.

(57) ABSTRACT

The present invention aims to provide a luminescent display system capable of safely and easily displaying information at a predetermined luminance over a wide area, and a head-up display including the luminescent display system. Provided is a luminescent display system including: a luminescent resin film containing a thermoplastic resin and a luminescent material; and two or more light sources each configured to emit a light beam of excitation wavelength for the luminescent material, the luminescent resin film and two or more light sources being placed such that the light beams emitted from the light sources at least partly overlap on the luminescent resin film.

5 Claims, 1 Drawing Sheet

(51) Int. Cl.
  *B32B 27/30* (2006.01)
  *G02B 27/01* (2006.01)
  *B60K 35/00* (2006.01)

(52) U.S. Cl.
  CPC ........ *B32B 17/10761* (2013.01); *B32B 27/30* (2013.01); *F21V 9/32* (2018.02); *G02B 27/0101* (2013.01); *B32B 2307/422* (2013.01); *B32B 2315/08* (2013.01); *B32B 2329/06* (2013.01); *B32B 2457/20* (2013.01); *B60K 35/00* (2013.01); *B60K 2370/1529* (2019.05); *B60K 2370/167* (2019.05); *B60K 2370/33* (2019.05); *B60K 2370/68* (2019.05); *G02B 2027/0118* (2013.01)

(58) Field of Classification Search
  CPC .......... B32B 17/10036; B32B 2457/20; B32B 17/00; G02B 27/0101; G02B 2027/0118; G02B 27/01; F21V 9/32; B60K 35/00; B60K 2370/68; B60K 2370/167; B60K 2370/1529; B60K 2370/343; G03B 23/61; G03B 21/14; G03B 21/62
  See application file for complete search history.

(56) References Cited

U.S. PATENT DOCUMENTS

| | | | |
|---|---|---|---|
| 9,989,681 B2 * | 6/2018 | Greb | G02B 5/201 |
| 10,202,074 B2 * | 2/2019 | Kumada | B60Q 3/68 |
| 2008/0018558 A1 | 1/2008 | Kykta et al. | |
| 2012/0068083 A1 | 3/2012 | Labrot et al. | |
| 2014/0293467 A1 | 10/2014 | Palikaras et al. | |
| 2014/0355106 A1 | 12/2014 | Laluet et al. | |
| 2015/0316838 A1 | 11/2015 | Laluet et al. | |
| 2018/0194996 A1 * | 7/2018 | Frischeisen | C09K 11/663 |
| 2018/0290437 A1 * | 10/2018 | Kobayashi | B32B 17/10605 |
| 2019/0317323 A1 * | 10/2019 | Yamaoka | G02B 27/0101 |

FOREIGN PATENT DOCUMENTS

| | | |
|---|---|---|
| JP | 4-315138 | 11/1992 |
| JP | 11-38506 | 2/1999 |
| JP | 2014-24312 | 2/2014 |
| JP | 2014-206630 | 10/2014 |
| JP | 2015-196617 | 11/2015 |
| JP | 2016-69215 | 5/2016 |
| WO | 91/06031 | 5/1991 |

OTHER PUBLICATIONS

International Search Report dated Jun. 19, 2018 in International (PCT) Application No. PCT/JP2018/012418.
Extended European Search Report dated Nov. 11, 2020, in corresponding European Patent Application No. 18778145.5.

* cited by examiner

LIGHT-EMITTING DISPLAY SYSTEM AND HEAD-UP DISPLAY

TECHNICAL FIELD

The present invention relates to a luminescent display system capable of safely and easily displaying information at a predetermined luminance over a wide area, and a head-up display including the luminescent display system.

BACKGROUND ART

Laminated glass is less likely to scatter even when fractured by external impact and can be safely used. Due to this advantage, laminated glass has been widely used in, for example, front, side, and rear windshields of vehicles including automobiles and windowpanes of aircraft, buildings, or the like. A known example of laminated glass is a type of laminated glass including at least a pair of glass plates integrated through, for example, an interlayer film for a laminated glass which contains a liquid plasticizer and a polyvinyl acetal resin.

In recent years, there has been a growing demand for head-up displays (HUDs) which present meters showing vehicle driving data (e.g., driving speed information) within the driver's visual field in the front windshield of the vehicle.

Various types of HUDs have been developed. The most typical one is a HUD designed such that a display unit of the instrumental panel projects information (e.g. driving speed information) sent from the control unit onto the front windshield to enable the driver to view the information at a usual viewpoint, namely, within the driver's visual field in the front windshield.

An exemplary interlayer film for a laminated glass for a HUD is an interlayer film for a laminated glass having a wedge shape with a predetermined wedge angle proposed in Patent Literature 1. This interlayer film can solve a HUD's drawback that a meter image displayed on a laminated glass appears double.

Patent Literature 1 also discloses a laminated glass which is partially free from the HUD's drawback of double meter image phenomenon. Yet, not the entire face of the laminated glass is free from the double meter image phenomenon.

In response to this, the applicant of the present application discloses, in Patent Literature 2, an interlayer film for a laminated glass containing a binder resin and at least one luminescent material selected from the group consisting of luminescent particles, a luminescent pigment, and a luminescent dye. Luminescent materials become luminous under irradiation of light of specific wavelengths. When the interlayer film for a laminated glass containing such a luminescent material is irradiated with a light beam, the contained luminescent particles become luminous, so that images can be displayed.

CITATION LIST

Patent Literature

Patent Literature 1: JP H04-502525 T
Patent Literature 2: JP 2014-24312 A

SUMMARY OF INVENTION

Technical Problem

The amount of information desired to be displayed on HUDs has recently continued to increase. Displaying information over a wider area, if possible on the entire face of the front windshield, has been increasingly demanded. The luminance of a luminescent material greatly depends on the irradiation intensity of light from the light source and the distance between the light source and the display portion. Displaying information over a wide area unavoidably involves the use of a light source with significantly high irradiation intensity, which causes safety issues. Even if irradiation from a close distance is attempted, it is difficult to place the light source in a limited space such that information can be displayed over a wide area.

The present invention aims to provide a luminescent display system capable of safely and easily displaying information at a predetermined luminance over a wide area, and a head-up display including the luminescent display system.

Solution to Problem

The present invention relates to a luminescent display system including: a luminescent resin film containing a thermoplastic resin and a luminescent material; and two or more light sources each configured to emit a light beam of excitation wavelength for the luminescent material, the luminescent resin film and two or more light sources being placed such that the light beams emitted from the light sources at least partly overlap on the luminescent resin film.

The present invention is described in detail below.

The present inventors studied a luminescent display system capable of safely and easily displaying information at a predetermined luminance in a wide area. As a result, the inventors found out that even with light sources having irradiation intensity levels safe for practical use, information can be displayed at a predetermined luminance over a wider area by providing two or more light sources and placing the light sources such that light beams emitted therefrom at least partly overlap on a luminescent resin film. The inventors also found out that the light sources can be placed in a limited space because even when the light sources are placed comparatively distant from the luminescent resin film, information can be displayed at a predetermined luminance over a sufficiently wide area. The inventors thus completed the present invention.

FIG. 1 is a schematic view illustrating a method of displaying information by the luminescent display system of the present invention. In FIG. 1, the luminescent display system includes a luminescent resin film 1 and two light sources (a light source 2 and a light source 3). Upon irradiation of the luminescent resin film 1 with light beams of excitation wavelength for the luminescent material from the light source 2 and the light source 3, information is displayed on the luminescent resin film 1.

The light source 2 and the light source 3 are placed such that emitted light beams overlap on the luminescent resin film 1. The overlap of the light beams emitted from the two light sources on the luminescent resin film 1 enables display of information at high luminance over a wide area even when the individual light sources have low irradiation intensity. In addition, even when the individual light sources are placed comparatively distant from the luminescent resin film, a sufficient effect can be obtained. Thus, the flexibility in placement of the light sources is high. Comparison with the luminescent display system shown in FIG. 2, which includes only one light source 4, clearly shows the difference in the effect.

The two or more light sources are preferably placed such that emitted light beams completely overlap on the luminescent resin film, but may be placed such that the light beams partly overlap. In the case where the light beams partly overlap, the overlapping portion displays information at particularly high luminance. Thus, particularly important information may be set to be displayed on the overlapping portion.

Herein, the overlapping ratio of the light beams emitted from the two or more light sources is defined as follows: when light beams emitted from the two or more light sources overlap, the overlapping ratio is defined by "overlapping ratio (%)=$S_2/S_1 \times 100$" wherein $S_1$ is the area that is irradiated with the light beam from one of the light sources and is smaller than the area irradiated with the light beam from the other light source on the luminescent resin film, and $S_2$ is the area of part of $S_1$ overlapping the other irradiated area. In the case where light beams are emitted from three or more light sources, the overlapping ratio is preferably determined for every possible pair of light sources.

For safer display of information at higher luminance, at least one pair of light sources preferably has an overlapping ratio of 10% or higher, more preferably 30% or higher, still more preferably 50% or higher, particularly preferably 70% or higher, most preferably 100%. For even safer display of information at even higher luminance, all the pairs of light sources preferably have an overlapping ratio of 10% or higher, more preferably 30% or higher, still more preferably 50% or higher, particularly preferably 70% or higher, most preferably 100%.

The luminescent display system of the present invention includes a luminescent resin film containing a thermoplastic resin and a luminescent material. The luminescent material becomes luminous under irradiation with a light beam of excitation wavelength, so that information can be displayed on the luminescent resin film. In other words, the luminescent resin film serves as a screen for displaying information.

Any thermoplastic resin may be used, and examples thereof include polyvinyl acetal resins, ethylene-vinyl acetate copolymer resins, ethylene-acryl copolymer resins, polyurethane resins, polyurethane resins containing sulfur element, polyvinyl alcohol resins, vinyl chloride resins, polyethylene terephthalate resins, and ionomer resins. Suitable among these are polyvinyl acetal resins because a polyvinyl acetal resin used in combination with a plasticizer can exhibit excellent adhesiveness to glass in the case where the luminescent display system of the present invention is used as a HUD.

The polyvinyl acetal resin is not particularly limited as long as it is obtained by acetalization of polyvinyl alcohol with an aldehyde, and is preferably polyvinyl butyral. Two or more kinds of polyvinyl acetal resins may be used in combination as needed.

The lower limit of the degree of acetalization of the polyvinyl acetal resin is preferably 40 mol % and the upper limit thereof is preferably 85 mol %. The lower limit is more preferably 60 mol % and the upper limit is more preferably 75 mol %.

In the case where the luminescent display system of the present invention is used as a HUD, the lower limit of the hydroxy group content of the polyvinyl acetal resin is preferably 15 mol % and the upper limit thereof is preferably 35 mol %. When the hydroxy group content is 15 mol % or more, formation of the luminescent resin film is facilitated. When the hydroxy group content is 35 mol % or less, the luminescent resin film to be obtained is easy to handle.

The degree of acetalization and the hydroxy group content can be measured in accordance with, for example, "Testing methods for polyvinyl butyral" in JIS K 6728.

The polyvinyl acetal resin can be prepared by acetalization of polyvinyl alcohol with an aldehyde. The polyvinyl alcohol is normally prepared by saponifying polyvinyl acetate. Polyvinyl alcohol commonly used has a degree of saponification of 70 to 99.8 mol %.

The lower limit of the degree of polymerization of the polyvinyl alcohol is preferably 500 and the upper limit thereof is preferably 4,000. When the polyvinyl alcohol has a degree of polymerization of 500 or more, the laminated glass produced using the luminescent display system of the present invention as a HUD has higher penetration resistance. When the polyvinyl alcohol has a degree of polymerization of 4,000 or less, formation of the luminescent resin film is facilitated. The lower limit of the degree of polymerization of the polyvinyl alcohol is more preferably 1,000 and the upper limit thereof is more preferably 3,600.

The aldehyde is not particularly limited. Commonly, preferred is a C1-C10 aldehyde. The C1-C10 aldehyde is not particularly limited, and examples thereof include n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are n-butyraldehyde, n-hexylaldehyde, and n-valeraldehyde, and more preferred is n-butyraldehyde. These aldehydes may be used alone or in combination of two or more thereof.

Specific examples of the luminescent material include a lanthanoid complex with a ligand containing a halogen atom because high luminescent properties can be exhibited.

Among lanthanoid complexes, the lanthanoid complex with a ligand containing a halogen atom becomes luminous at a high intensity under irradiation with a light beam. Examples of the lanthanoid complex with a ligand containing a halogen atom include lanthanoid complexes with a monodentate ligand containing a halogen atom and lanthanoid complexes with a multidentate ligand containing a halogen atom (e.g., lanthanoid complexes with a bidentate ligand containing a halogen atom, lanthanoid complexes with a tridentate ligand containing a halogen atom, lanthanoid complexes with a tetradentate ligand containing a halogen atom, lanthanoid complexes with a pentadentate ligand containing a halogen atom, lanthanoid complexes with a hexadentate ligand containing a halogen atom).

In particular, a lanthanoid complex with a bidentate ligand containing a halogen atom or a lanthanoid complex with a tridentate ligand containing a halogen atom becomes luminous at a wavelength of 580 to 780 nm at a significantly high intensity under irradiation with light at a wavelength of 300 to 410 nm. Owing to such high-intensity luminescence, the luminescent display system including a luminescent resin film containing the lanthanoid complex can become luminous at a relatively high luminance even under irradiation with a low-intensity light beam.

In addition, the lanthanoid complex with a bidentate ligand containing a halogen atom or lanthanoid complex with a tridentate ligand containing a halogen atom is also excellent in heat resistance. In the case where the luminescent display system is used as a HUD in automobile roof glass or building window glass, for example, the automobile roof glass or building window glass is often used in a high temperature environment because it is irradiated with infrared rays in the sunlight. In such a high temperature environment, the luminescent material may be deteriorated especially at an end portion of the laminated glass. The lanthanoid complex with a bidentate ligand containing a halogen atom or a lanthanoid complex with a tridentate ligand containing a halogen atom as a luminescent material is less likely to deteriorate even in a high temperature environment.

As used herein, examples of the lanthanoid include lanthanum, cerium, praseodymium, neodymium, promethium, samarium, europium, gadolinium, terbium, dysprosium, holmium, erbium, thulium, ytterbium, and lutetium. For higher emission intensity, the lanthanoid is preferably neodymium, europium, or terbium, more preferably europium or terbium, still more preferably europium.

Examples of the bidentate ligand containing a halogen atom include ligands having a structure represented by the following formula (1) and ligands having a structure represented by the following formula (2).

[Chem. 1]

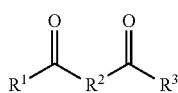
(1)

In the formula (1), $R^1$ and $R^3$ each are an organic group and at least one of $R^1$ and $R^3$ represents an organic group containing a halogen atom, and $R^2$ is a linear organic group having one or more carbon atoms. $R^1$ and $R^3$ each are preferably a hydrocarbon group, more preferably a C1-C10 hydrocarbon group, still more preferably a C1-C5 hydrocarbon group, particularly preferably a C1-C3 hydrocarbon group. The hydrogen atoms in the hydrocarbon group may be partly substituted with an atom other than hydrogen atom or a functional group. Examples of the C1-C3 hydrocarbon group include methyl, ethyl, and propyl groups in which no hydrogen atom is substituted and methyl, ethyl, and propyl groups in which hydrogen atoms are partly substituted with a halogen atom. The halogen atom substituting a part of the hydrogen atoms in the methyl, ethyl, and propyl groups may be fluorine atom, chlorine atom, bromine atom, or iodine atom. The C1-C3 hydrocarbon group is preferably a methyl, ethyl, or propyl group in which hydrogen atoms are partly substituted with a halogen atom, with a trifluoromethyl group being more preferred, because luminescence at a high intensity can be achieved.

$R^2$ is preferably an alkylene group having one or more carbon atoms, more preferably a C1-C5 alkylene group, and most preferably a C1 methylene group. The hydrogen atoms in the alkylene group having one or more carbon atoms may be partly substituted with an atom other than hydrogen atom and a functional group.

The lanthanoid complex with a ligand containing a halogen atom is only required to have at least one ligand containing a halogen atom and may additionally have a ligand not containing a halogen atom. Examples of the ligand not containing a halogen atom include ligands having the same structure as that of the formula (1) except for not including a halogen atom and ligands having a structure represented by any of the following formulae (2) to (8). The hydrogen atoms in the ligand having a structure represented by any of the formulae (2) to (8) may be partly or entirely substituted with —COOR, —SO$_3$, —NO$_2$, —OH, an alkyl group, or —NH$_2$.

[Chem. 2]

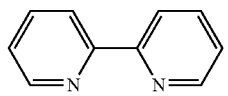
(2)

In the formula (2), two Ns may be present at any positions in the bipyridine skeleton. For example, two Ns may be present at 2- and 2'-positions, 3- and 3'-positions, 4- and 4'-positions, 2- and 3'-positions, 2- and 4'-positions, or 3- and 4'-positions. In particular, two Ns are preferably present at 2- and 2'-positions.

[Chem. 3]

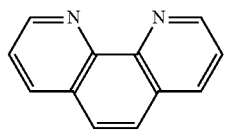
(3)

In the formula (3), two Ns may be present at any positions in the bipyridine skeleton. In particular, two Ns are preferably present at 1- and 10-positions.

[Chem. 4]

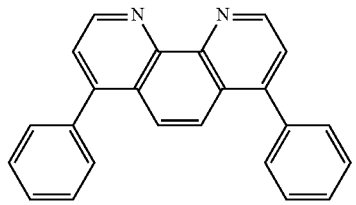
(4)

In the formula (4), two Ns may be present at any positions in the bipyridine skeleton. In particular, two Ns are preferably present at 1- and 10-positions.

[Chem. 5]

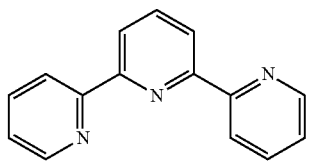
(5)

In the formula (5), three Ns may be present at any positions in the terpyridine skeleton.

[Chem. 6]

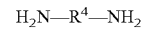
(6)

In the formula (6), $R^4$ at the center represents a linear organic group having one or more carbon atoms.

[Chem. 7]

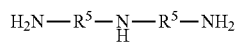
(7)

In the formula (7), two R⁵s each represent a linear organic group having one or more carbon atoms.

[Chem. 8]

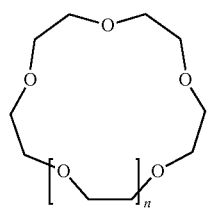
(8)

In the formula (8), n represents an integer of 1 or 2.

Examples of the lanthanoid complexes with a bidentate ligand containing a halogen atom include tris(trifluoroacetylacetone)phenanthroline europium (Eu(TFA)$_3$phen), tris(trifluoroacetylacetone)diphenyl phenanthroline europium (Eu(TFA)$_3$dpphen), tris(hexafluoroacetylacetone)diphenyl phenanthroline europium, tris(hexafluoroacetylacetone)bis(triphenylphosphine) europium, tris(trifluoroacetylacetone)2,2'-bipyridine europium, tris(hexafluoroacetylacetone)2,2'-bipyridine europium, tris(5,5,6,6,7,7,7-heptafluoro-2,4-pentanedionate)2,2'-bipyridine europium ([Eu(FPD)$_3$]bpy), tris(trifluoroacetylacetone)3,4,7,8-tetramethyl-1,10 phenanthroline europium ([Eu(TFA)$_3$]tmphen), tris(5,5,6,6,7,7,7-heptafluoro-2,4-pentanedionate)phenanthroline europium ([Eu(FPD)$_3$]phen), terpyridine trifluoroacetylacetone europium, and terpyridine hexafluoroacetylacetone europium.

Other examples of the lanthanoid complexes with a bidentate ligand containing a halogen atom include tris(trifluoroacetylacetone)phenanthroline terbium (Tb(TFA)$_3$phen), tris(trifluoroacetylacetone)diphenyl phenanthroline terbium (Tb(TFA)$_3$dpphen), tris(hexafluoroacetylacetone)diphenyl phenanthroline terbium, tris(hexafluoroacetylacetone)bis(triphenylphosphine)terbium, tris(trifluoroacetylacetone)2,2'-bipyridine terbium, tris(hexafluoroacetylacetone)2,2'-bipyridine terbium, tris(5,5,6,6,7,7,7-heptafluoro-2,4-pentanedionate)2,2'-bipyridine terbium ([Tb(FPD)$_3$]bpy), tris(trifluoroacetylacetone)3,4,7,8-tetramethyl-1,10 phenanthroline terbium ([Tb(TFA)$_3$]tmphen), tris(5,5,6,6,7,7,7-heptafluoro-2,4-pentanedionate)phenanthroline terbium ([Tb(FPD)$_3$]phen), terpyridine trifluoroacetylacetone terbium, and terpyridine hexafluoroacetylacetone terbium.

Examples of the halogen atom in the lanthanoid complex with a ligand containing a halogen atom include a fluorine atom, a chlorine atom, a bromine atom, and an iodine atom. Preferred is a fluorine atom for better stability of the ligand structure.

Among the lanthanoid complexes with a bidentate ligand containing a halogen atom or the lanthanoid complexes with a tridentate ligand containing a halogen atom, a lanthanoid complex with a bidentate ligand containing a halogen atom and having an acetylacetone skeleton is preferred because of its excellent initial luminescent properties.

Examples of the lanthanoid complex with a bidentate ligand containing a halogen atom and having an acetylacetone skeleton include Eu(TFA)$_3$phen, Eu(TFA)$_3$dpphen, Eu(HFA)$_3$phen, [Eu(FPD)$_3$]bpy, [Eu(TFA)$_3$]tmphen, and [Eu(FPD)$_3$]phen. The structures of these lanthanoid complexes with a bidentate ligand containing a halogen atom and having an acetylacetone skeleton are shown below.

[Chem. 9]

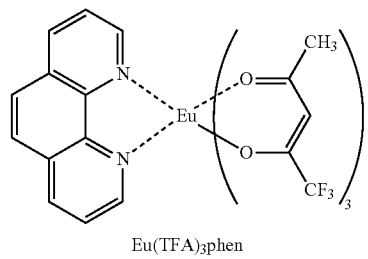

Eu(TFA)$_3$phen

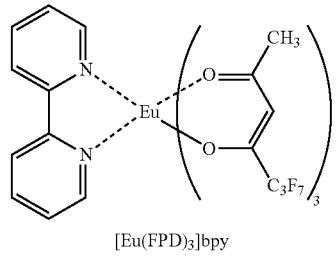

[Eu(FPD)$_3$]bpy

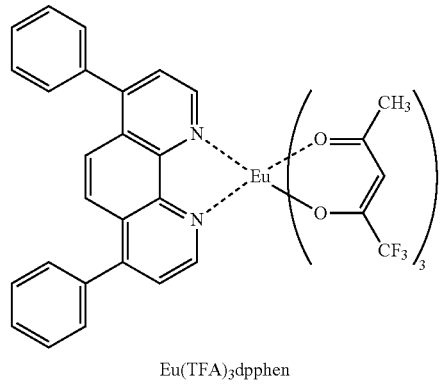

Eu(TFA)$_3$dpphen

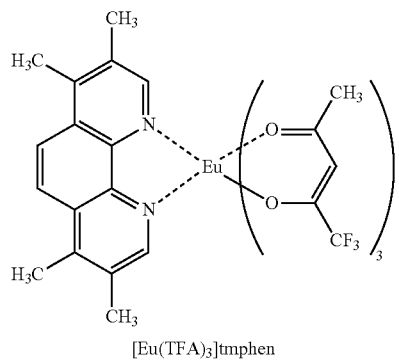

[Eu(TFA)$_3$]tmphen

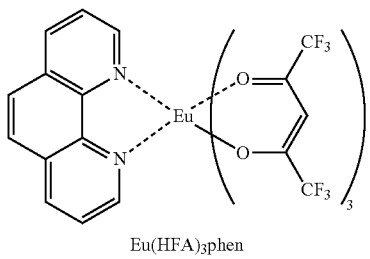

Eu(HFA)₃phen

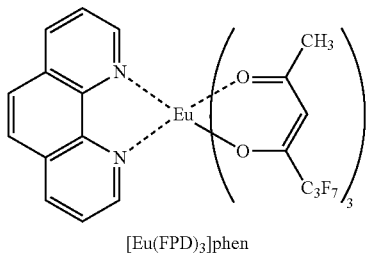

[Eu(FPD)₃]phen

Other examples of the lanthanoid complex with a bidentate ligand containing a halogen atom and having an acetylacetone skeleton include Tb(TFA)₃phen, Tb(TFA)₃dpphen, Tb(HFA)₃phen, [Tb(FPD)₃]bpy, [Tb(TFA)₃]tmphen, and [Tb(FPD)₃]phen.

The lanthanoid complex with a ligand containing a halogen atom is preferably in the form of particles. The lanthanoid complex with a ligand containing a halogen atom in the form of particles can be readily finely dispersed in the thermoplastic resin.

In the case where the lanthanoid complex with a ligand containing a halogen atom is in the form of particles, the lower limit of the average particle size of the lanthanoid complex is preferably 0.01 μm and the upper limit thereof is preferably 10 μm. The lower limit is more preferably 0.03 μm and the upper limit is more preferably 1 μm.

The luminescent material used may be a luminescent material having a terephthalic acid ester structure. The luminescent material having a terephthalic acid ester structure becomes luminous under irradiation with a light beam.

Examples of the luminescent material having a terephthalic acid ester structure include compounds having a structure represented by the formula (9) and compounds having a structure represented by the formula (10).

Each of these may be used alone or in combination of two or more thereof.

[Chem. 10]

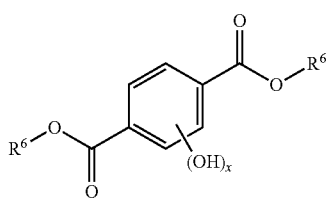

(9)

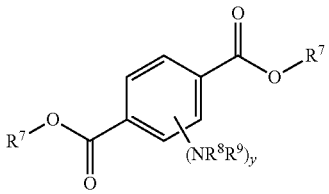

(10)

In the formula (9), $R^6$ is an organic group and x is 1, 2, 3, or 4.

For higher transparency of the luminescent display, x is preferably 1 or 2, and the luminescent material has a hydroxy group more preferably at 2 or 5 position of the benzene ring, still more preferably at 2 and 5 positions of the benzene ring.

The organic group of $R^6$ is preferably a hydrocarbon group, more preferably a C1-C10 hydrocarbon group, still more preferably a C1-C5 hydrocarbon group, particularly preferably a C1-C3 hydrocarbon group.

When the hydrocarbon group has 10 or less carbon atoms, the luminescent material having a terephthalic acid ester structure can be easily dispersed in the thermoplastic resin.

The hydrocarbon group is preferably an alkyl group.

Examples of the compound having a structure represented by the formula (9) include diethyl-2,5-dihydroxyterephthalate and dimethyl-2,5-dihydroxyterephthalate. In particular, for display of an image at even higher luminance, the compound having a structure represented by the formula (9) is preferably diethyl-2,5-dihydroxyterephthalate ("diethyl 2,5-dihydroxyterephthalate" available from Sigma-Aldrich).

In the formula (10), $R^7$ is an organic group, $R^8$ and $R^9$ each are a hydrogen atom or an organic group, and y is 1, 2, 3, or 4.

The organic group of $R^7$ is preferably a hydrocarbon group, more preferably a C1-C10 hydrocarbon group, still more preferably a C1-C5 hydrocarbon group, particularly preferably a C1-C3 hydrocarbon group.

When the hydrocarbon group has a carbon number satisfying the upper limit, the luminescent material having a terephthalic acid ester structure can be easily dispersed in the thermoplastic resin.

The hydrocarbon group is preferably an alkyl group.

In the formula (10), $NR^8R^9$ is an amino group. $R^8$ and $R^9$ each are preferably a hydrogen atom.

The benzene ring in the compound having a structure represented by the formula (10) may have the amino group(s) at the position(s) of one hydrogen atom, two hydrogen atoms, three hydrogen atoms, or four hydrogen atoms among hydrogen atoms of the benzene ring.

For display of an image at even higher luminance, the compound having a structure represented by the formula (10) is preferably diethyl-2,5-diaminoterephthalate (Sigma-Aldrich).

The lower limit of the amount of the luminescent material in the luminescent resin film is preferably 0.001 parts by weight and the upper limit thereof is preferably 15 parts by weight, relative to 100 parts by weight of the thermoplastic resin. When the amount of the luminescent material is 0.001 parts by weight or more, an image can be displayed at even higher luminance. When the amount of the luminescent material is 15 parts by weight or less, the transparency of the luminescent display is further improved. The lower limit of the amount of the luminescent material is more preferably 0.01 parts by weight and the upper limit thereof is more preferably 10 parts by weight. The lower limit is still more preferably 0.05 parts by weight and the upper limit is still more preferably 8 parts by weight. The lower limit is particularly preferably 0.1 parts by weight and the upper limit is particularly preferably 5 parts by weight. The upper limit is most preferably 1 part by weight.

The luminescent resin film preferably further contains a dispersant. The use of a dispersant can inhibit aggregation of the luminescent material, leading to further uniform luminescence.

The dispersant used may be, for example, a compound having a sulfonic acid structure such as linear alkyl benzene sulfonates; a compound having an ester structure such as diester compounds, ricinoleic acid alkyl esters, phthalic acid esters, adipic acid esters, sebacic acid esters, and phosphoric acid esters; a compound having an ether structure such as polyoxyethylene glycols, polyoxypropylene glycols, and alkyl phenyl-polyoxyethylene-ethers; a compound having a carboxylic acid structure such as polycarboxylic acids; a compound having an amine structure such as laurylamine, dimethyllaurylamine, oleyl propylenediamine, polyoxyethylene secondary amine, polyoxyethylene tertiary amine, and polyoxyethylene diamine; a compound having a polyamine structure such as polyalkylene polyamine alkylene oxide; a compound having an amide structure such as oleic acid diethanolamide and alkanol fatty acid amide; and a compound having a high-molecular-weight amide structure such as polyvinylpyrrolidone and polyester acid amidoamine salt. Also, the dispersant used may be a high-molecular-weight dispersant such as polyoxyethylene alkyl ether phosphoric acid (salt), high-molecular-weight polycarboxylic acids, and condensed ricinoleic acid esters. The high-molecular-weight dispersant is defined as a dispersant having a molecular weight of 10,000 or higher.

In the case where the dispersant is used, the lower limit of the amount of the dispersant relative to the luminescent material in the luminescent resin film is preferably 1 part by weight and the upper limit thereof is preferably 50 parts by weight. When the amount of the dispersant is within the above range, the luminescent material can be uniformly dispersed in the thermoplastic resin. The lower limit of the amount of the dispersant is more preferably 3 parts by weight and the upper limit thereof is more preferably 30 parts by weight. The lower limit is still more preferably 5 parts by weight and the upper limit is still more preferably 25 parts by weight.

The luminescent resin film may further contain an ultraviolet absorber. The luminescent resin film containing an ultraviolet absorber increases the light resistance of the luminescent display.

For displaying an image at even higher luminance, the upper limit of the amount of the ultraviolet absorber in the luminescent resin film is preferably 1 part by weight, more preferably 0.5 parts by weight, still more preferably 0.2 parts by weight, particularly preferably 0.1 parts by weight, relative to 100 parts by weight of the thermoplastic resin.

Examples of the ultraviolet absorber include compounds having a malonic acid ester structure, compounds having an oxanilide structure, compounds having a benzotriazole structure, compounds having a benzophenone structure, compounds having a triazine structure, compounds having a benzoate structure, and compounds having a hindered amine structure.

The luminescent resin film may further contain a plasticizer.

Any plasticizer may be used, and examples thereof include organic ester plasticizers such as monobasic organic acid esters and polybasic organic acid esters, and phosphoric acid plasticizers such as organophosphate plasticizers and organophosphite plasticizers. The plasticizer is preferably a liquid plasticizer.

The monobasic organic acid esters are not particularly limited, and examples thereof include glycol esters obtained by a reaction between a glycol and a monobasic organic acid. Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octylic acid, 2-ethylhexylic acid, pelargonic acid (or n-nonylic acid), and decylic acid. In particular, preferred are triethylene glycol dicaproic acid ester, triethylene glycol-di-2-ethylbutyric acid ester, triethylene glycol-di-n-octylic acid ester, and triethylene glycol-di-2-ethylhexylic acid ester.

The polybasic organic acid esters are not particularly limited, and examples thereof include ester compounds of a polybasic organic acid (e.g., adipic acid, sebacic acid, azelaic acid) with a C4-C8 linear or branched alcohol. In particular, preferred are dibutyl sebacic acid ester, dioctyl azelaic acid ester, and dibutyl carbitol adipic acid ester.

The organic ester plasticizers are not particularly limited, and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapriate, dihexyl adipate, dioctyl adipate, hexylcyclohexyl adipate, diisononyl adipate, heptylnonyl adipate, dibutyl sebacate, oil-modified alkyd sebacate, mixtures of phosphoric acid esters and adipic acid esters, adipic acid esters, mixed type adipic acid esters prepared from C4-C9 alkyl alcohols and C4-C9 cyclic alcohols, and C6-C8 adipic acid esters such as hexyl adipate.

The organophosphate plasticizers are not particularly limited, and examples thereof include tributoxyethyl phosphate, isodecylphenyl phosphate, and triisopropyl phosphate.

Among these, the plasticizer is preferably at least one selected from the group consisting of dihexyl adipate (DHA), triethylene glycol di-2-ethylhexanoate (3GO), tetraethylene glycol di-2-ethylhexanoate (4GO), triethylene glycol di-2-ethylbutyrate (3GH), tetraethylene glycol di-2-ethylbutyrate (4GH), tetraethylene glycol di-n-heptanoate (4G7), and triethylene glycol di-n-heptanoate (3G7).

For less hydrolysis, the plasticizer preferably contains triethylene glycol di-2-ethylhexanoate (3GO), triethylene glycol di-2-ethylbutyrate (3GH), tetraethylene glycol di-2-ethylhexanoate (4GO), or dihexyl adipate (DHA), more preferably tetraethylene glycol di-2-ethylhexanoate (4GO) or triethylene glycol di-2-ethylhexanoate (3GO), still more preferably triethylene glycol di-2-ethylhexanoate (3GO).

The amount of the plasticizer in the luminescent resin film is not particularly limited. The lower limit thereof is preferably 30 parts by weight and the upper limit thereof is preferably 100 parts by weight relative to 100 parts by weight of the thermoplastic resin. When the amount of the plasticizer is 30 parts by weight or more, the luminescent resin film has a lower melt viscosity and thus can be easily formed. When the amount of the plasticizer is 100 parts by weight or less, the transparency of the luminescent resin film is further improved. The lower limit of the amount of the plasticizer is more preferably 35 parts by weight and the upper limit thereof is more preferably 80 parts by weight. The lower limit is still more preferably 45 parts by weight and the upper limit is still more preferably 70 parts by weight. The lower limit is particularly preferably 50 parts by weight and the upper limit is particularly preferably 63 parts by weight.

For achieving excellent light resistance, the luminescent resin film preferably contains an antioxidant.

The antioxidant may be any antioxidant, and examples thereof include antioxidants having a phenol structure, antioxidants containing sulfur, and antioxidants containing phosphor.

The antioxidants having a phenol structure are antioxidants having a phenol skeleton. Examples of the antioxidants having a phenol structure include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis [methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and pentaerythritol tetrakis [3-(3,5-di-tert-butyl-4-hydroxyphenyl)propionate]. These antioxidants may be used alone or in combination of two or more thereof.

The luminescent resin film may contain an adhesion modifier to adjust the adhesive force to glass.

The adhesion modifier used is suitably, for example, at least one selected from the group consisting of an alkali metal salt, an alkaline earth metal salt, and a magnesium salt. Examples of the adhesion modifier include salts of potassium, sodium, magnesium, and the like.

Examples of an acid constituting the salts include organic acids such as carboxylic acids (e.g., octylic acid, hexylic acid, 2-ethylbutyric acid, butyric acid, acetic acid, formic acid) and inorganic acids such as hydrochloric acid and nitric acid.

The luminescent resin film may contain, if needed, additives such as light stabilizers, antistatic agents, blue pigments, blue dyes, green pigments, and green dyes.

The thickness of the luminescent resin film is not particularly limited. The lower limit thereof is preferably 100 μm and the upper limit thereof is preferably 2,000 μm. When the thickness of the luminescent resin film is within this range, information can be displayed at high luminance. The lower limit of the thickness of the luminescent resin film is more preferably 300 μm, still more preferably 740 μm, particularly preferably 760 μm. The upper limit thereof is more preferably 1,600 μm, still more preferably 1,400 μm, particularly preferably 880 μm.

The luminescent resin film may be used as a single layer or used in the form of a multilayer resin film in which the luminescent resin film and a different resin film are stacked (hereinafter also referred to simply as a "multilayer resin film").

In the case where the luminescent resin film is used in the form of a multilayer resin film, the luminescent resin film may be disposed on the entire or part of a face of the multilayer resin film, and may be disposed on the entire or part of a face in a direction perpendicular to the thickness direction of the multilayer resin film. In the case where the luminescent resin film is partially disposed, information can be controlled to be displayed only at the disposed part as a luminescent area without being displayed at the other part as a non-luminescent area.

In the case where the luminescent resin film is used in the form of a multilayer resin film, the multilayer resin film with various functions can be produced by controlling the components constituting the luminescent resin film and the different resin film.

For example, in order to impart sound insulation properties to the multilayer resin film, the amount of the plasticizer (hereafter, also referred to as amount X) relative to 100 parts by weight of the thermoplastic resin in the luminescent resin film may be controlled to be more than the amount of the plasticizer (hereafter, also referred to as amount Y) relative to 100 parts by weight of the thermoplastic resin in the different resin film. In this case, the amount X is more than the amount Y preferably by 5 parts by weight or more, more preferably by 10 parts by weight or more, still more preferably by 15 parts by weight or more. For allowing the multilayer resin film to have higher penetration resistance, the difference between the amount X and the amount Y is preferably 50 parts by weight or less, more preferably 40 parts by weight or less, still more preferably 35 parts by weight or less. The difference between the amount X and the amount Y is calculated based on the equation: (difference between the amount X and the amount Y)=(the amount X−the amount Y).

The lower limit of the amount X is preferably 45 parts by weight and the upper limit thereof is preferably 80 parts by weight. The lower limit is more preferably 50 parts by weight and the upper limit is more preferably 75 parts by weight. The lower limit is still more preferably 55 parts by weight and the upper limit is still more preferably 70 parts by weight. When the amount X is adjusted to the preferable lower limit or more, high sound insulation properties can be exerted. When the amount X is adjusted to the preferable upper limit or less, the plasticizer can be prevented from bleeding out, so that a reduction in the transparency or the adhesiveness of the multilayer resin film can be prevented.

The lower limit of the amount Y is preferably 20 parts by weight and the upper limit thereof is preferably 45 parts by weight. The lower limit is more preferably 30 parts by weight and the upper limit is more preferably 43 parts by weight. The lower limit is still more preferably 35 parts by weight and the upper limit is still more preferably 41 parts by weight. When the amount Y is adjusted to the preferable lower limit or more, high penetration resistance can be exerted. When the amount Y is adjusted to the preferable upper limit or less, the plasticizer can be prevented from bleeding out, so that a reduction in the transparency or the adhesiveness of the multilayer resin film can be prevented.

In order to impart sound insulation properties to the multilayer resin film, the thermoplastic resin in the luminescent resin film is preferably a polyvinyl acetal X. The polyvinyl acetal X can be prepared by acetalization of polyvinyl alcohol with an aldehyde. The polyvinyl alcohol can be commonly prepared by saponification of polyvinyl acetate. The lower limit of the average degree of polymerization of the polyvinyl alcohol is preferably 200 and the upper limit thereof is preferably 5,000. When the average degree of polymerization of the polyvinyl alcohol is 200 or higher, the penetration resistance of the multilayer resin film to be obtained can be improved. When the average degree of polymerization of the polyvinyl alcohol is 5,000 or lower, formability of the luminescent resin film can be ensured. The lower limit of the average degree of polymerization of the polyvinyl alcohol is more preferably 500 and the upper limit thereof is more preferably 4,000. The average degree of polymerization of the polyvinyl alcohol is determined by a method in accordance with "Testing methods for polyvinyl alcohol" in JIS K 6726.

The lower limit of the carbon number of an aldehyde used for acetalization of the polyvinyl alcohol is preferably 4 and the upper limit thereof is preferably 6. When an aldehyde having 4 or more carbon atoms is used, a sufficient amount of the plasticizer can be stably contained so that excellent sound insulation properties can be obtained. Moreover, bleeding out of the plasticizer can be prevented. When an aldehyde having 6 or less carbon atoms is used, synthesis of the polyvinyl acetal X is facilitated to ensure the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the plasticizer can be contained in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %.

The hydroxy group content of the polyvinyl acetal X is a value in percentage (mol %) of the mol fraction obtained by dividing the amount of ethylene groups to which hydroxy groups are bonded by the amount of all the ethylene groups in the main chain. The amount of ethylene groups to which hydroxy groups are bonded can be determined by measuring the amount of ethylene groups to which hydroxy groups are bonded in the polyvinyl acetal X by a method in accordance with "Testing methods for polyvinyl butyral" in JIS K 6728.

The lower limit of the acetal group content of the polyvinyl acetal X is preferably 60 mol % and the upper limit thereof is preferably 85 mol %. When the acetal group content of the polyvinyl acetal X is 60 mol % or more, the luminescent resin film has higher hydrophobicity and can contain the plasticizer in an amount needed for exhibiting sound insulation properties, and bleeding out of the plasticizer and whitening can be prevented. When the acetal group content of the polyvinyl acetal X is 85 mol % or less, synthesis of the polyvinyl acetal X is facilitated to ensure the productivity. The lower limit of the acetal group content of the polyvinyl acetal X is more preferably 65 mol %, still more preferably 68 mol % or more.

The acetal group content can be determined by measuring the amount of ethylene groups to which acetal groups are bonded in the polyvinyl acetal X by a method in accordance with "Testing methods for polyvinyl butyral" in JIS K 6728.

The lower limit of the acetyl group content of the polyvinyl acetal X is preferably 0.1 mol % and the upper limit thereof is preferably 30 mol %. When the acetyl group content of the polyvinyl acetal X is 0.1 mol % or more, the plasticizer can be contained in an amount needed for exhibiting sound insulation properties, and bleeding out of the plasticizer can be prevented. When the acetyl group content of the polyvinyl acetal X is 30 mol % or less, the luminescent resin film has higher hydrophobicity to prevent whitening. The lower limit of the acetyl group content of the polyvinyl acetal X is more preferably 1 mol %, still more preferably 5 mol %, particularly preferably 8 mol %, and the upper limit thereof is more preferably 25 mol %, still more preferably 20 mol %.

The acetyl group content is a value in percentage (mol %) of the mol fraction obtained by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain.

The polyvinyl acetal X is preferably a polyvinyl acetal with the acetyl group content of 8 mol % or more or a polyvinyl acetal with the acetyl group content of less than 8 mol % and the acetal group content of 65 mol % or more. In this case, the luminescent resin film can readily contain the plasticizer in an amount needed for exhibiting sound insulation properties. The polyvinyl acetal X is more preferably a polyvinyl acetal having the acetyl group content of 8 mol % or more or a polyvinyl acetal having the acetyl group content of less than 8 mol % and the acetal group content of 68 mol % or more.

In order to impart sound insulation properties to the multilayer resin film, the thermoplastic resin in the different resin film is preferably a polyvinyl acetal Y. The polyvinyl acetal Y preferably has a greater hydroxy group content than the polyvinyl acetal X.

The polyvinyl acetal Y can be prepared by acetalization of polyvinyl alcohol with an aldehyde. The polyvinyl alcohol can be commonly obtained by saponification of polyvinyl acetate. The lower limit of the average degree of polymerization of the polyvinyl alcohol is preferably 200 and the upper limit thereof is preferably 5,000. When the average degree of polymerization of the polyvinyl alcohol is 200 or more, the penetration resistance of the multilayer resin film can be improved. When the average degree of polymerization of the polyvinyl alcohol is 5,000 or less, the formability of the different resin film can be ensured. The lower limit of the average degree of polymerization of the polyvinyl alcohol is more preferably 500 and the upper limit thereof is more preferably 4,000.

The lower limit of the carbon number of an aldehyde used for acetalization of the polyvinyl alcohol is preferably 3 and the upper limit thereof is preferably 4. When the aldehyde having 3 or more carbon atoms is used, the penetration resistance of the multilayer resin film is improved. When the aldehyde having 4 or less carbon atoms is used, the productivity of the polyvinyl acetal Y is improved. The C3-C4 aldehyde may be a linear or branched aldehyde, and examples thereof include n-butyraldehyde.

The upper limit of the hydroxy group content of the polyvinyl acetal Y is preferably 33 mol % and the lower limit thereof is preferably 28 mol %. When the hydroxy group content of the polyvinyl acetal Y is 33 mol % or less, whitening of the multilayer resin film can be prevented. When the hydroxy group content of the polyvinyl acetal Y is 28 mol % or more, the penetration resistance of the multilayer resin film can be improved.

The lower limit of the acetal group content of the polyvinyl acetal Y is preferably 60 mol % and the upper limit thereof is preferably 80 mol %. When the acetal group content is 60 mol % or more, the plasticizer in an amount needed for exhibiting sufficient penetration resistance can be contained. When the acetal group content is 80 mol % or less, the adhesive force between the different resin film and glass can be ensured. The lower limit of the acetal group content of the polyvinyl acetal Y is more preferably 65 mol % and the upper limit thereof is more preferably 69 mol %.

The upper limit of the acetyl group content of the polyvinyl acetal Y is preferably 7 mol %. When the acetyl group content of the polyvinyl acetal Y is 7 mol % or less, the different resin film has higher hydrophobicity, thereby preventing whitening. The upper limit of the acetyl group content of the polyvinyl acetal Y is more preferably 2 mol %, and the lower limit thereof is preferably 0.1 mol %.

The hydroxy group content, acetal group content, and acetyl group content of the polyvinyl acetal Y can be measured by the same methods as those described for the polyvinyl acetal X.

In order to impart heat insulation properties to the multilayer resin film, for example, one, two, or all of the luminescent resin film and different resin film(s) may contain a heat ray absorber.

The heat ray absorber is not particularly limited as long as it blocks infrared rays. Preferred is at least one selected from the group consisting of tin-doped indium oxide (ITO) particles, antimony-doped tin oxide (ATO) particles, aluminum-doped zinc oxide (AZO) particles, indium-doped zinc oxide (IZO) particles, tin-doped zinc oxide particles, silicon-doped zinc oxide particles, lanthanum hexaboride particles, and cerium hexaboride particles.

The thickness of the multilayer resin film is not particularly limited. The lower limit of the thickness is preferably 50 μm and the upper limit thereof is preferably 1,700 μm. The lower limit is more preferably 100 μm and the upper limit is more preferably 1,000 μm. The upper limit is still more preferably 900 μm. The lower limit of the thickness of the multilayer resin film means the thickness of the thinnest part of the multilayer resin film. The upper limit of the thickness of the multilayer resin film means the thickness of the thickest part of the multilayer resin film.

The thickness of the luminescent resin film in the multilayer resin film is not particularly limited. The lower limit thereof is preferably 50 μm and the upper limit is preferably 1,000 μm. When the luminescent resin film has a thickness within this range, the contrast of luminescence is sufficiently high under irradiation with a light beam having a specific wavelength. The lower limit of the thickness of the multilayer resin film is more preferably 80 μm and the upper limit thereof is more preferably 500 μm. The lower limit is still more preferably 90 μm and the upper limit is still more preferably 300 μm.

The luminescent resin film and the multilayer resin film may each have a wedge-shaped cross section. In the case where the cross section is wedge-shaped, double image phenomenon can be prevented when the luminescent display system is used as, for example, a HUD. From the standpoint of reducing the double image phenomenon, the upper limit of the wedge angle θ of the wedge shape is preferably 1 mrad. In the case where a film having a wedge-shaped cross section is produced by, for example, extrusion molding a resin composition using an extruder, the film may have its minimum thickness in a region slightly inward from one end on the thinner side (specifically, a region spaced inward from one end on the thinner side by a distance of 0X to 0.2X where X is the distance between the one end and the other end). The film may also have its maximum thickness in a region slightly inward from one end on the thicker side (specifically, a region spaced inward from one end on the thicker side by a distance of 0X to 0.2X where X is the distance between the one end and the other end). Herein, such a shape is included in the wedge shape.

In the case of the multilayer resin film having a wedge-shaped cross section, the cross-sectional shape of the entire multilayer resin film can be controlled to have a wedge shape with a certain wedge angle by controlling the thickness of the luminescent resin film to be within a certain range and stacking the different resin film as a shape-adjusting layer. Alternatively, the cross-sectional shape of the entire multilayer resin film can be controlled to have a wedge shape with a certain wedge angle by using the luminescent resin film and the different resin film at least one of which has a wedge shape. The different resin film may be stacked on only one or both of the surfaces of the luminescent resin film. Further, multiple different resin films may be stacked.

The luminescent resin film may have a wedge-shaped cross section or a rectangular cross section. Preferably, the difference between the maximum thickness and the minimum thickness of the luminescent resin film is 100 μm or less. In this case, it is possible to prevent significant variation in the luminance of information displayed under irradiation of light beams. The difference between the maximum thickness and the minimum thickness of the luminescent resin film is more preferably 95 μm or less, still more preferably 90 μm or less.

In the case where the luminescent resin film or the multilayer resin film has a wedge-shaped cross section, the thickness of the luminescent resin film is not particularly limited. The lower limit of the thickness is preferably 50 μm and the upper limit thereof is preferably 700 μm. When the luminescent resin film has a thickness within the above range, uniform information can be displayed. The lower limit of the thickness of the luminescent resin film is more preferably 70 μm and the upper limit thereof is more preferably 400 μm. The lower limit is still more preferably 80 μm and the upper limit is still more preferably 150 μm. The lower limit of the thickness of the luminescent resin film means the thickness of the thinnest part of the luminescent resin film. The upper limit of the thickness of the luminescent resin film means the thickness of the thickest part of the luminescent resin film.

The different resin film is stacked on the luminescent resin film to control the cross-sectional shape of the entire multilayer resin film into a wedge shape with a certain wedge angle. Preferably, the different resin film has a wedge-shaped, triangular, trapezoidal, or rectangular cross section. The cross-sectional shape of the entire multilayer resin film can be controlled to be a wedge shape with a certain wedge angle by stacking a different resin film having a wedge-shaped, triangular, or trapezoidal cross section as a shape-adjusting layer. Moreover, the cross-sectional shape of the entire multilayer resin film can be controlled using multiple shape-adjusting layers in combination.

The thickness of the different resin film is not particularly limited. In view of the practical aspect and sufficient enhancement of the adhesive force and penetration resistance, the lower limit of the thickness is preferably 10 μm and the upper limit thereof is preferably 1,000 μm. The lower limit is more preferably 200 μm and the upper limit is more preferably 800 μm. The lower limit is still more preferably 300 μm. The lower limit of the thickness of the different resin film means the thickness of the thinnest part of the different resin film. The upper limit of the thickness of the different resin film means the thickness of the thickest part of the different resin film. When multiple different resin films are used in combination, the thickness of the different resin film means a total thickness of the different resin films.

The luminescent resin film and the multilayer resin film are each preferably reinforced with at least one glass plate. The luminescent resin film and the multilayer resin film each may be interposed between a pair of glass plates and used in the form of a laminated glass.

The glass plates may be transparent plate glass commonly used. Examples thereof include inorganic glass such as float plate glass, polished plate glass, molded plate glass, wired glass, wire-reinforced plate glass, colored plate glass, heat-absorbing glass, heat-reflecting glass, and green glass. Also usable is UV light-shielding glass in which a UV light-shielding coat layer is formed on the surface of glass. However, such glass is preferably used as a glass plate on a side opposite to the side irradiated with a light beam having a specific wavelength. Moreover, organic plastic plates such as polyethylene terephthalate, polycarbonate, or polyacrylate plates may also be used.

As the glass plates, two or more kinds of glass plates may be used. Exemplary cases thereof include a laminated glass in which the luminescent resin film or multilayer resin film is interposed between a transparent float plate glass and a colored glass plate such as green glass. Moreover, as the glass plates, two or more kinds of glass plates different in the thickness may be used.

The luminescent display system of the present invention includes light sources.

The light sources each emit a light beam of excitation wavelength for the luminescent material in the luminescent resin film. The light sources each emit the light beam to allow information to be displayed on the luminescent resin film. The emitted light beam includes light of excitation wavelength for the luminescent material, and is selected according to the type of the luminescent material.

The luminescent display system of the present invention includes two or more light sources. The light sources are placed such that light beams emitted from the light sources at least partly overlap on the luminescent resin film. This placement enables display of information at high luminance over a wide area even when the individual light sources have low irradiation intensity. In addition, even when the individual light sources are placed comparatively distant from the luminescent resin film, a sufficient effect can be obtained. Thus, the flexibility in placement of the light sources is high.

The greater the number of light sources, the wider the area in which information can be displayed at high luminance. However, considering that the light sources are placed in a limited space, the substantial upper limit of the number of light sources is about 10.

The irradiation intensity of the light beam of excitation wavelength emitted from each light source is preferably 200 mW/cm$^2$ or lower. An irradiation intensity of 200 mW/cm$^2$ or lower ensures enough safety. In addition, with an irradiation intensity of 200 mW/cm$^2$ or lower, an unnecessary increase in the device size can be avoided, and the devices can be placed without difficulty. The irradiation intensity of the light beam of excitation wavelength emitted from each light source is more preferably 150 mW/cm$^2$ or lower, still more preferably 100 mW/cm$^2$ or lower.

The lower limit of the irradiation intensity of the light beam of excitation wavelength emitted from each light source is not particularly limited. For display of information at sufficient luminance, the irradiation intensity is preferably 10 mW/cm$^2$ or higher, more preferably 50 mW/cm$^2$ or higher.

The output power of the emitted light beam can be measured by irradiation intensity measurement with a laser power meter (e.g., "Beam track power sensor 3A-QUAD" available from Ophir Japan Ltd.) placed at a position of 10 cm distant from the light source.

Examples of the light sources include a spot light source (LC-8 available from Hamamatsu Photonixs K.K.), a xenon flash lamp (CW lamp available from Heraeus Holding), and a black light (Carry hand available from Iuchi Seieido Co., Ltd.).

The luminescent display system can safely and easily display information at a predetermined luminance in a wide area.

The luminescent display system of the present invention can be widely used in, for example, front, side, and rear windshields of vehicles including automobiles and windowpanes of aircraft, buildings, or the like. In particular, very useful as a head-up display is the luminescent display system of the present invention including a laminated glass including the luminescent resin film as an interlayer film for a laminated glass and two or more light sources.

Advantageous Effects of Invention

The present invention can provide a luminescent display system capable of safely and easily displaying information at a predetermined luminance over a wide area, and a head-up display including the luminescent display system.

DESCRIPTION OF EMBODIMENTS

Figure 1:
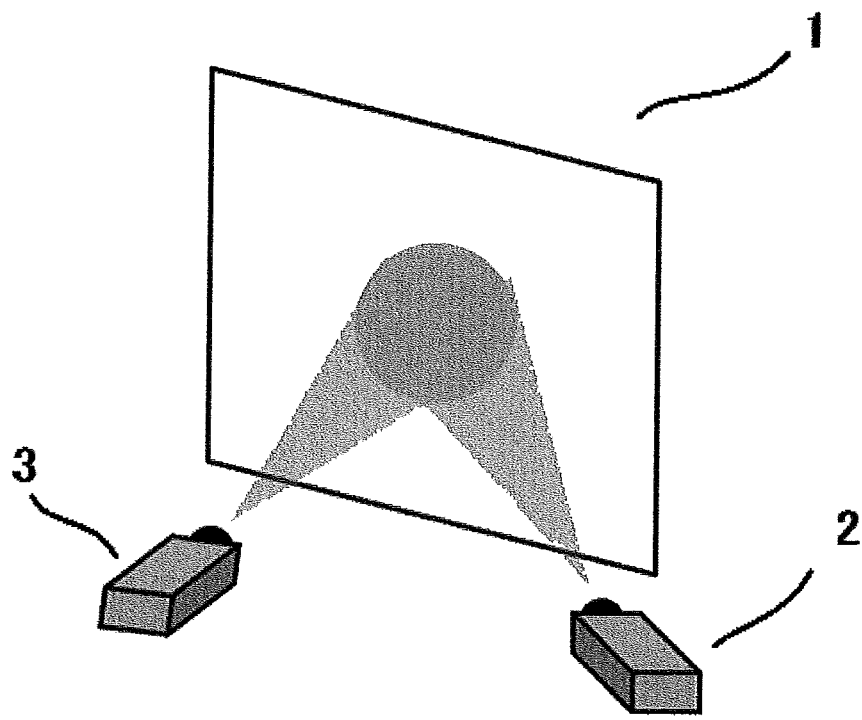
FIG. 1 is a schematic view illustrating a method of displaying information by the luminescent display system of the present invention.
Figure 2:
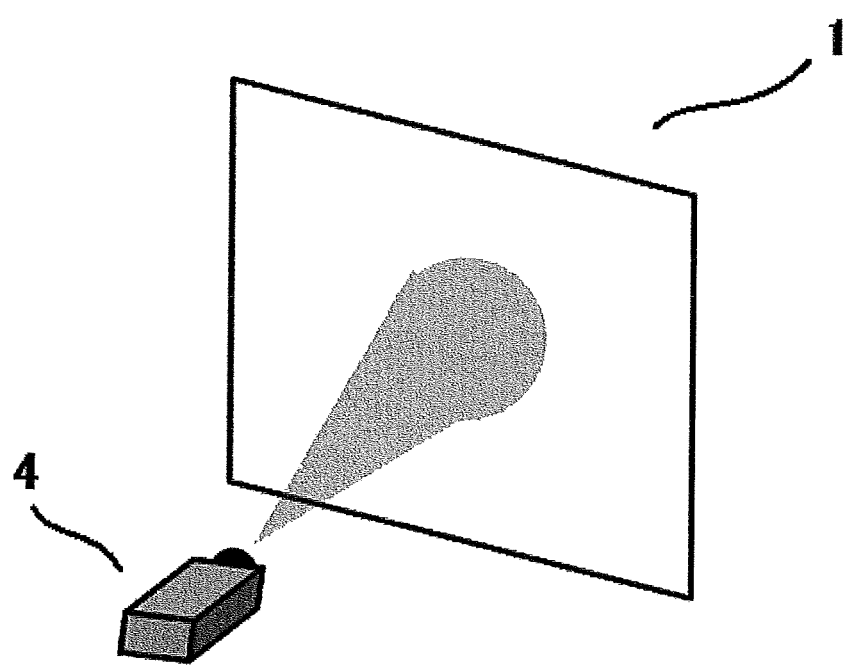
FIG. 2 is a schematic view illustrating a method of displaying information by a luminescent display system including only one light source.

The present invention is more specifically described in the following with reference to, but not limited to, examples.

Example 1

(1) Preparation of Polyvinyl Butyral

To a 2 m$^3$ reactor equipped with a stirrer were charged 1,700 kg of a 7.5% by mass aqueous solution of PVA (degree of polymerization: 1,700, degree of saponification: 99 mol %), 74.6 kg of n-butyraldehyde, and 0.13 kg of 2,6-di-t-butyl-4-methyl phenol, and the entire mixture was cooled to 14° C. Subsequently, 99.44 L of 30% by mass nitric acid was added to the mixture to initiate the butyralization of PVA. Ten minutes after the end of the addition, the temperature was raised to 65° C. over 90 minutes, followed by further reaction for 120 minutes. Thereafter, the temperature was lowered to room temperature, and the precipitated solid was obtained by filtration. The solid was washed ten times with a 10-fold amount (by mass) of ion exchange water. The washed solid was sufficiently neutralized using a 0.3% by mass sodium hydrogen carbonate aqueous solution and was then washed ten times with a 10-fold amount (by mass) of ion exchange water. The resulting solid was dehydrated and dried, thereby obtaining polyvinyl butyral resin (PVB).

(2) Production of Luminescent Resin Film and Laminated Glass

A luminescent plasticizer solution was prepared by adding 0.54 parts by weight of diethyl-2,5-dihydroxyterephthalate (available from Sigma-Aldrich, "diethyl 2,5-dihydroxyterephthalate") to 40 parts by weight of triethylene glycol di-2-ethylhexanoate (3GO). The entire amount of the obtained plasticizer solution was mixed and sufficiently kneaded with 100 parts by weight of the obtained polyvinyl butyral using a mixing roll to prepare a resin composition.

The obtained resin composition was extruded using an extruder to provide a luminescent resin film having a thickness of 760 μm.

The obtained luminescent resin film as an interlayer film for a laminated glass was interposed between a pair of clear glass plates (thickness: 2.5 mm, 5 cm in length×5 cm in width) to prepare a laminate. The laminate was pressed under vacuum at 90° C. for 30 minutes to be press-bonded using a vacuum laminator. The press-bonded laminate was subjected to further 20-minute press-bonding under 14 MPa at 140° C. using an autoclave, thereby obtaining a laminated glass.

(3) Construction of Luminescent Display System

Two or three pico projectors (available from Sony Corporation) were provided as light sources. Each light source was set such that its light beam of a wavelength 405 nm had an irradiation intensity of 200 mW/cm$^2$.

The light sources were placed such that light beams emitted therefrom would overlap on the obtained laminated glass.

Example 2

Europium acetate (Eu(CH$_3$COO)$_3$) in an amount of 12.5 mmol was dissolved in 50 mL of distilled water. To the solution was added 33.6 mmol of trifluoroacetylacetone (TFA, CH$_3$COCH$_2$COCF$_3$), and the mixture was stirred at room temperature for 3 hours. The mixture was filtered to obtain precipitated solid. The precipitated solid was washed with water, and recrystallized using methanol and distilled water to give Eu(TFA)$_3$(H$_2$O)$_2$. Then, 5.77 g of the resulting complex (Eu(TFA)$_3$(H$_2$O)$_2$) and 2.5 g of 1,10-phenanthroline(phen) were dissolved in 100 mL of methanol, followed by heating under reflux for 12 hours. After 12 hours, methanol was distilled off under reduced pressure, thereby obtaining a white product. The white product powder was washed with toluene so that unreacted materials were removed by suction filtration. Subsequently, toluene was distilled off under reduced pressure, thereby preparing a powder. Through recrystallization using a solvent mixture of toluene and hexane, Eu(TFA)$_3$phen was obtained.

A luminescent resin film and a laminated glass were produced as in Example 1 except that instead of 0.54 parts by weight of diethyl-2,5-dihydroxyterephthalate (available from Sigma-Aldrich, "diethyl 2,5-dihydroxyterephthalate"), 0.4 parts by weight of the obtained Eu(TFA)$_3$phen was added to 40 parts by weight of 3GO. A luminescent display system was constructed by placing two or three light sources.

Example 3

Terbium acetate (Tb(CH$_3$COO)$_3$) in an amount of 12.5 mmol was dissolved in 50 mL of distilled water. To the solution was added 33.6 mmol of trifluoroacetylacetone (TFA, CH$_3$COCH$_2$COCF$_3$), and the mixture was stirred at room temperature for 3 hours. The mixture was filtered to obtain precipitated solid. The precipitated solid was washed with water, and recrystallized using methanol and distilled water to give Tb(TFA)$_3$(H$_2$O)$_2$. Then, 5.77 g of the obtained complex (Tb(TFA)$_3$(H$_2$O)$_2$) and 2.5 g of 1,10-phenanthroline(phen) were dissolved in 100 mL of methanol, followed by heating under reflux for 12 hours. After 12 hours, methanol was distilled off under reduced pressure, thereby obtaining a white product. The white product powder was washed with toluene so that unreacted materials were removed by suction filtration. Subsequently, toluene was distilled off under reduced pressure, thereby preparing a powder. Through recrystallization using a solvent mixture of toluene and hexane, Tb(TFA)$_3$phen was obtained.

A luminescent resin film and a laminated glass were produced as in Example 1 except that instead of 0.54 parts by weight of diethyl-2,5-dihydroxyterephthalate (available from Sigma-Aldrich, "diethyl 2,5-dihydroxyterephthalate"), 0.4 parts by weight of the obtained Tb(TFA)$_3$phen was added to 40 parts by weight of 3GO. A luminescent display system was constructed by placing two or three light sources.

Comparative Examples 1 to 3

Luminescent resin films and laminated glasses were produced as in Examples 1 to 3 except that the number of light sources and the irradiation intensity were as shown in Table 2. Luminescent display systems were constructed by placing two or three light sources.

(Evaluation)

The luminescent display systems obtained in the examples and comparative examples were evaluated by the following methods.

Tables 1 and 2 show the results.

(1) Safety Evaluation

The safety of the luminescent display system was evaluated as follows.

"○ (Good)": Each light source had an irradiation intensity of 200 mW/cm$^2$ or lower.

"x (Poor)": Each light source had an irradiation intensity of higher than 200 mW/cm$^2$.

(2) Display Luminance Evaluation

A luminance meter ("SR-3AR", available from Topcon Technohouse Corporation) was placed on the side to be irradiated with light, at an angle of 45 degrees relative to the surface of the laminated glass to be irradiated with light and at a shortest distance of 35 cm from the surface of the laminated glass. The laminated glass was then irradiated with light from the light source(s), and the luminance of information displayed on the laminated glass was measured.

In the case where multiple light sources were used, the luminance was measured at an overlapping portion of the light beams from all the light sources.

TABLE 1

| | | | Example 1 | | | Example 2 | | | Example 3 | | |
|---|---|---|---|---|---|---|---|---|---|---|---|
| Interlayer film formulation (parts by weight) | Thermoplastic resin | | 100 | | | 100 | | | 100 | | |
| | Plasticizer | | 40 | | | 40 | | | 40 | | |
| | Luminescent material | Diethyl 2,5-dihydroxyterephthalate | 0.54 | | | — | | | — | | |
| | | Eu(TFA)$_3$phen | — | | | 0.4 | | | — | | |
| | | Tb(TFA)$_3$phen | — | | | — | | | 0.4 | | |
| Light source | The number of light sources | | 3 | 2 | 2 | 3 | 2 | 2 | 3 | 2 | 2 |
| | Overlapping ratio (%) | | 100 | 100 | 100 | 100 | 100 | 100 | 100 | 100 | 100 |
| | Irradiation intensity of each light source (mW/cm$^2$) | | 200 | 200 | 100 | 200 | 200 | 100 | 200 | 200 | 100 |

TABLE 1-continued

|  |  | Example 1 | | | Example 2 | | | Example 3 | | |
|---|---|---|---|---|---|---|---|---|---|---|
| Evaluation | Safety | ○ | ○ | ○ | ○ | ○ | ○ | ○ | ○ | ○ |
|  | Luminance (cd/m$^2$) | 20000 | 13000 | 6700 | 50800 | 34000 | 17000 | 15000 | 10000 | 5000 |

TABLE 2

|  |  |  | Comparative Example 1 | | | Comparative Example 2 | | | Comparative Example 3 | | |
|---|---|---|---|---|---|---|---|---|---|---|---|
| Interlayer film formulation (parts by weight) | Thermoplastic resin | | 100 | | | 100 | | | 100 | | |
|  | Plasticizer | | 40 | | | 40 | | | 40 | | |
|  | Luminescent material | Diethyl 2,5-dihydroxyterephthalate | 0.54 | | | — | | | — | | |
|  |  | Eu(TFA)$_3$phen | — | | | 0.4 | | | — | | |
|  |  | Tb(TFA)$_3$phen | — | | | — | | | 0.4 | | |
| Light source | The number of light sources | | 1 | 1 | 1 | 1 | 1 | 1 | 1 | 1 | 1 |
|  | Irradiation intensity of each light source (mW/cm$^2$) | | 600 | 400 | 100 | 600 | 400 | 100 | 600 | 400 | 100 |
| Evaluation | Safety | | x | x | ○ | x | x | ○ | x | x | ○ |
|  | Luminance (cd/m$^2$) | | 20000 | 13000 | 3300 | 50800 | 34000 | 8500 | 15000 | 10000 | 2500 |

INDUSTRIAL APPLICABILITY

The present invention can provide a luminescent display system capable of safely and easily displaying information at a predetermined luminance over a wide area, and a head-up display including the luminescent display system.

REFERENCE SIGNS LIST

1 luminescent resin film
2 light source
3 light source
4 light source

The invention claimed is:

1. A luminescent display system comprising:
a luminescent resin film containing a thermoplastic resin and a luminescent material; and
two or more light sources each configured to emit a light beam of excitation wavelength for the luminescent material,
the luminescent resin film and two or more light sources being placed such that the light beams emitted from the light sources at least partly overlap on the luminescent resin film,
wherein the light beam of excitation wavelength emitted from each light source has an irradiation intensity of 200 mW/cm$^2$ or lower, and
wherein an overlapping ratio of the light beams emitted from at least one pair of light sources is 50% or higher.

2. The luminescent display system according to claim 1, wherein the luminescent resin film is provided in the form of a multilayer resin film in which the luminescent resin film and a different resin film are stacked.

3. The luminescent display system according to claim 1, wherein the luminescent resin film is reinforced with at least one glass plate.

4. The luminescent display system according to claim 1, wherein the luminescent resin film is provided in the form of a laminated glass in which the luminescent resin film is interposed between a pair of glass plates.

5. A head-up display comprising
the luminescent display system according to claim 1.

* * * * *